US012479235B2

United States Patent
Wu (10) Patent No.: US 12,479,235 B2
(45) Date of Patent: Nov. 25, 2025

(54) RIM ACCESSORY FOR WHEEL POSITIONING ANGLE DETECTION, WARNING SYSTEM FOR WHEEL POSITIONING ANGLE DETECTION AND WARNING METHOD FOR WHEEL POSITIONING ANGLE DETECTION

(71) Applicant: YAO SHIN AUTOCAR INTERNATIONAL CO., LTD., Taipei (TW)

(72) Inventor: Hung-Chuan Wu, Taoyuan (TW)

(73) Assignee: SHIN RUEI INTELLIGENT VEHICLE TECHNOLOGY CO., LTD., Taipei (TW)

( * ) Notice: Subject to any disclaimer, the term of this patent is extended or adjusted under 35 U.S.C. 154(b) by 493 days.

(21) Appl. No.: 17/984,340

(22) Filed: Nov. 10, 2022

(65) Prior Publication Data

US 2024/0157727 A1    May 16, 2024

(51) Int. Cl.
*B60B 21/12*    (2006.01)
*B60C 23/04*    (2006.01)

(52) U.S. Cl.
CPC .......... *B60B 21/12* (2013.01); *B60C 23/0416* (2013.01)

(58) Field of Classification Search
CPC ................ B60B 21/12; B60C 23/0416
See application file for complete search history.

(56) References Cited

U.S. PATENT DOCUMENTS

| 10,464,380 B2 | 11/2019 | Araya |
| 2001/0028154 A1 | 10/2001 | Sebe |
| 2009/0125251 A1 | 5/2009 | Pirelli |
| 2012/0123646 A1 | 5/2012 | Mantini et al. |

(Continued)

FOREIGN PATENT DOCUMENTS

| CN | 202119423 A | 1/2012 |
| CN | 107399207 A | 11/2017 |

(Continued)

OTHER PUBLICATIONS

Office Action with the first search report for the corresponding TW Appln. 113109922 issued at Jun. 14, 2024.

(Continued)

*Primary Examiner* — Eric S. McCall
(74) *Attorney, Agent, or Firm* — Demian K. Jackson; Jackson IPG PLLC (57) ABSTRACT

A rim accessory for wheel positioning angle detection is illustrated, which can be detachably installed in a rim of a wheel of a vehicle. The rim accessory has a housing body and a sensor module. The housing body can be detachably installed in the rim, and the sensor module is installed in the housing body, and the sensor module used to generate multiple measurement data. The multiple measurement data are used to calculate multiple inclined angle data of the wheel in respect to at least a reference axis. A warning system and method for the wheel positioning angle detection are also illustrated, the warning system or method is used to compare the inclined angle data with a standard value, and (Continued)

when the inclined angle data deviates from a specific range of the standard value, the warning system or method sends out a warning message.

17 Claims, 11 Drawing Sheets

(56) References Cited

U.S. PATENT DOCUMENTS

| | | | |
|---|---|---|---|
| 2016/0075226 A1* | 3/2016 | Biderman | B60L 50/20 |
| | | | 301/6.5 |
| 2016/0076973 A1 | 3/2016 | White et al. | |
| 2018/0370300 A1* | 12/2018 | Guinart | B60C 23/06 |
| 2020/0031182 A1 | 1/2020 | Lee | |
| 2021/0396544 A1 | 12/2021 | Guo | |
| 2025/0206290 A1* | 6/2025 | Hajiloo | B60W 40/11 |
| 2025/0224311 A1* | 7/2025 | Patibandla | G01M 17/065 |

FOREIGN PATENT DOCUMENTS

| | | |
|---|---|---|
| CN | 107399207 Y | 11/2017 |
| CN | 218986541 | 5/2023 |
| TW | 201641922 A | 12/2016 |
| TW | I681886 B | 1/2020 |
| TW | I771173 B | 7/2022 |
| TW | I774424 B | 8/2022 |
| TW | M639632 | 4/2023 |
| TW | M639632 U | 4/2023 |
| WO | 2009/070065 A1 | 6/2009 |

OTHER PUBLICATIONS

PCT search report for the corresponding Appln. PCTIB2023059494 issued at Dec. 22, 2023.

Office Action with the first search report for the corresponding TW Appln. 111137856 issued Jun. 12, 2023.

Office Action with the first search report for the corresponding JP Appln. 2022-178837 issued at Oct. 31, 2023.

* cited by examiner

RIM ACCESSORY FOR WHEEL POSITIONING ANGLE DETECTION, WARNING SYSTEM FOR WHEEL POSITIONING ANGLE DETECTION AND WARNING METHOD FOR WHEEL POSITIONING ANGLE DETECTION

TECHNICAL FIELD

The present disclosure relates to a field of a wheel positioning angle detection device, and particularly to, a rim accessory for wheel positioning angle detection which a sensor module of detecting a wheel inclined angle is installed in a rim, and to a warning system and method for the wheel positioning angle detection using the rim accessory.

RELATED ART

Wheels are installed in a vehicle, and the vehicle can go forward or backoff when each wheel rotates in respect to a wheel shaft. Since the wheel of the vehicle body is connected to the vehicle body, such that the wheel and partial of the vehicle forms a force transmission structure for rotating, and a balance between the wheel and the vehicle body not only affects driving safety, but also influence a lifetime of the vehicle.

A conventional installation procedure of the wheel of the vehicle comprises performing a balance test of wheels (each of the wheels comprises a rim and a tire) after the tires are installed on the rims to form the wheels, so as to achieve a dynamic rotation balance of the wheels by adjusting a position of a weighting center of each of the rims (i.e. adding/reducing weights on a proper position of each of the rims) according to a test result. After the wheel is connected to a wheel shaft, to adjust a value of a friction force between the tires and a ground and a force applying direction, thereby increasing the stability of the vehicle when driving, the inclined angle values of the wheels are usually regulated appropriately, that is, the so-called wheel positioning is performed. In this way, loads of a suspension system and a steering system of the vehicle are in line with original design specifications, avoiding increasing of the suspension system loss and the steering system loss, and at the same time maintaining the balance state of the vehicle when driving, which increases the driving safety and comfort.

The existing wheel positioning is that the driver implements at the manufacturer which provides a specific wheel positioning service, so the driver is usually unable to know whether the inclined angle of the wheel changes when driving the vehicle, and often waits until the vehicle appears in a bad situation, for example, the vehicle body produces jitter or makes abnormal noises, the driver will drive the vehicle into the repair shop, so it is easy to cause driving safety problems, and it is also easy to increasing the of the suspension system loss and steering system loss due to the improper inclined angle of the wheel. Therefore, how to detect the wheel state in real time and warn the driver is a critical issue.

TW issued Patent TWI771173B discloses a tire pressure detection chip installed on the tire to detect a tire pressure in real time and generate a warning message for drivers. However, TW issued Patent TWI771173B discloses the tire pressure detection, and it does not propose a solution to detect the inclined angle of wheel of the vehicle. TW issued Patent I774424B discloses a method of detecting a wheel speed to determine whether the wheel is left or right, and it also does not provide a solution to detect the inclined angle of wheel of the vehicle. In addition, the tire pressure detection chip is installed at the connection between the tire and the rim. Disassembly and assembly of the detection device must be conducted by the manufacturer, and users cannot purchase and install it by themselves, which is not conducive to the promotion of this technology.

SUMMARY

To solve the technical problem mentioned above, an objective of the present disclosure is to provide a rim accessory for wheel positioning angle detection, a warning system for the wheel positioning angle detection and a warning method for the wheel positioning angle detection. In the present disclosure, the sensor module containing the accelerometer and gyroscope is installed in the rim accessory, and then the sensor module is installed in the rim when the rim accessory is installed in the rim. The present disclosure can obtain a plurality of inclined angle values of the wheels by means of the multiple measurement data of the sensor module and issue a warning message after comparing the plurality of inclined angle values with the standard inclined angle values.

A rim accessory for wheel positioning angle detection provided by the present disclosure is detachably installed in a rim, wherein the rim has a peripheral surface and an axial surface, the peripheral surface of the rim is used to combine with a tire to form a wheel, the axial surface is rotatably combined with a wheel shaft, and the rim accessory for the wheel positioning angle detection comprises a housing body and a sensor module. The housing body is detachably installed in the rim. The sensor module installed in the housing body is configured to generate at least one measurement data, wherein the at least one measurement data is used to calculate an inclined angle data of the wheel in respect to at least a reference axis. The housing body is a rim cover of the rim, which is used to installed in a central hole, the sensor module comprises at least a sensor, and the sensor is an accelerometer of a micro electromechanical system (MEMS).

According to the above features, the sensor module is installed on a surface of the housing body facing to the central hole.

According to the above features, the sensor module is located in the central hole.

According to the above features, the housing body has a bottom wall and a peripheral wall connected to the bottom wall, the bottom wall and the peripheral wall forms an accommodation space, the sensor module is disposed on the bottom wall and located in the accommodation space, and the peripheral wall has a clamping structure, such that the housing body is able to be clamped to the central hole.

According to the above features, the sensor module further comprises a circuit board (21), and the accelerometer is disposed on the circuit board.

According to the above features, the at least one measurement data is multiple measurement data, the multiple measurement data are gravitational acceleration components measured by the accelerometer respectively along a first measurement axis, a second measurement axis and a third measurement axis, the first measurement axis is vertical to the axial surface of the rim, the second measurement axis and the third measurement axis are parallel to the axial surface of the rim and vertical to the first measurement axis, the second measurement axis and the third measurement axis are vertical to each other.

According to the above features, the sensor module further comprises a processor and a wireless transceiver unit, the processor and the wireless transceiver unit are disposed on the circuit board, the sensor and the wireless transceiver unit are electrically connected to the processor, the multiple measurement data are transmitted to the processor, and the processor performs a calculation on the multiple measurement data, or indicates the wireless transceiver unit to send the multiple measurement data.

According to the above features, the processor comprises a calculation unit, the calculation unit receives the multiple measurement data and calculates the multiple inclined angle data by using a specific algorithm.

According to the above features, the sensor module further comprises a battery unit, the battery unit is connected to the processor, and the battery unit provides electricity to the sensor module.

According to the above features, a first measurement axis of the sensor is vertical to the axial surface of the rim.

According to the above features, the first measurement axis is disposed on a center of the rim cover and/or a central axis of the central hole of the rim.

According to the above features, the first measurement axis is overlapped with the central axis of the central hole of the rim.

A warning system for the wheel positioning angle detection provided by the present disclosure comprises the above rim accessory for the wheel positioning angle detection of claim, a central processing unit and a warning unit. The central processing unit is used to receiving the measurement data to calculate the inclined angle, or used to receive the inclined angle, and used to compare the inclined angle data with a standard value, wherein when the inclined angle data deviates from a specific range of the standard value, the central processing unit generates a control signal. The warning unit connected to the central processing unit is used to receive the control signal and send out a warning message.

According to the above features, the central processing unit is installed in a vehicle computer of a vehicle, or the central processing unit is installed in a mobile device.

According to the above features, the warning system for the wheel positioning angle detection further comprises the above wheel, and the wheel has the above rim accessory for wheel the positioning angle detection.

According to the above features, the warning system for the wheel positioning angle detection further comprises a display. The display is used to display the inclined angle data on the display, and the display acts as the warning unit to display the warning message.

According to the above features, the warning unit is a sign device on a dashboard of the vehicle.

A warning method for the wheel positioning angle detection provided by the present disclosure comprises the following steps: an installation step: installing a rim accessory for the wheel positioning angle detection in a rim of a wheel of a vehicle, wherein the rim accessory for the wheel positioning angle detection comprises a sensor module and a housing body, the sensor module is installed in the housing body, the housing body is a rim cover of the rim which is used to installed in a central hole; a communication paring step making the sensor module pair with a device having a central processing unit to establish a communication link between the device and the sensor module; a measuring step: generating at least one measurement data by using the sensor module; a calculating step: calculating an inclined angle data of the wheel in respect to at least a reference axis according to a measurement data by executing a specific algorithm; and a comparing and warning step: comparing the inclined angle with a standard value by using the central processing unit, and when the inclined angle data deviates from a specific range of the standard value, sending out a warning message.

According to the above features, the warning method for the wheel positioning angle detection further comprises the following steps: a calibration step: installing the wheel which has been installed with the rim accessory for the wheel positioning angle detection in a vehicle, and performing a four-wheel alignment procedure to obtain the standard value of the inclined angle data.

According to the above features, the at least one measurement data of the calculation step is multiple measurement data, the multiple measurement data are used to calculate multiple inclined angle data of the wheel in respect to a first reference axis, a second reference axis and a third reference axis, wherein the first reference axis is defined to be parallel to a wheel shaft and vertical to a gravity direction, the second reference axis is defined to be vertical to the gravity direction and the gravity direction, and the third reference axis is defined to be parallel to the gravity direction.

A rim accessory for wheel positioning angle detection of the present disclosure can be detachably installed in a rim, and the user can buy it and then install it in the rim. When the vehicle is in a stopped state (the vehicle stops when it encounters a red light on a traffic sign) or when it continues to move, it detects the value of each inclined angle of the wheel, such as the outer inclined angle (camber, the included angle formed by a center line of the wheel and the vertical line) and other angles, and after comparing with the standard value range of each inclined angle, a warning message will be issued if the inclined angle deviates from the standard value range.

DETAILS OF EXEMPLARY EMBODIMENTS

Refer to FIG. 1, FIG. 2, FIG. 3 and FIG. 4, which depict an embodiment of a rim accessory for wheel positioning angle detection in the present disclosure. The rim accessory 100 for the wheel positioning angle detection can be installed in or removed from (i.e., detachably installed in) a rim R of a vehicle. The rim R can be installed on and connected to a wheel shaft F (see FIG. 5). The rim R has a peripheral surface and an axial surface R1. The peripheral surface of the rim R is used to combine with a tire W, so as to form a wheel T, and the axial surface R1 is ratably connected to a wheel shaft F. The rim accessory 100 for the wheel positioning angle detection comprises a housing body 10 and a sensor module 20. The sensor module 20 is installed in the housing body 10, and the housing body 10 is detachably installed in the rim R. In the embodiment of the present disclosure. The housing body 10 can be a rim cover which can be installed in a central hole R2 of the rim R, and the sensor module 20 is installed on a surface of the housing body 10 facing to the central hole R2. When the housing body 10 is installed in the rim R, the sensor module 20 is located in the central hole R2. The above arrangement is not used to limit the present disclosure, and in another one embodiment, the housing body 10 can be any one accessory part of the rim, which can be detachably installed in the rim R, for example, bolt cover or rim decoration trim.

Figure 1:
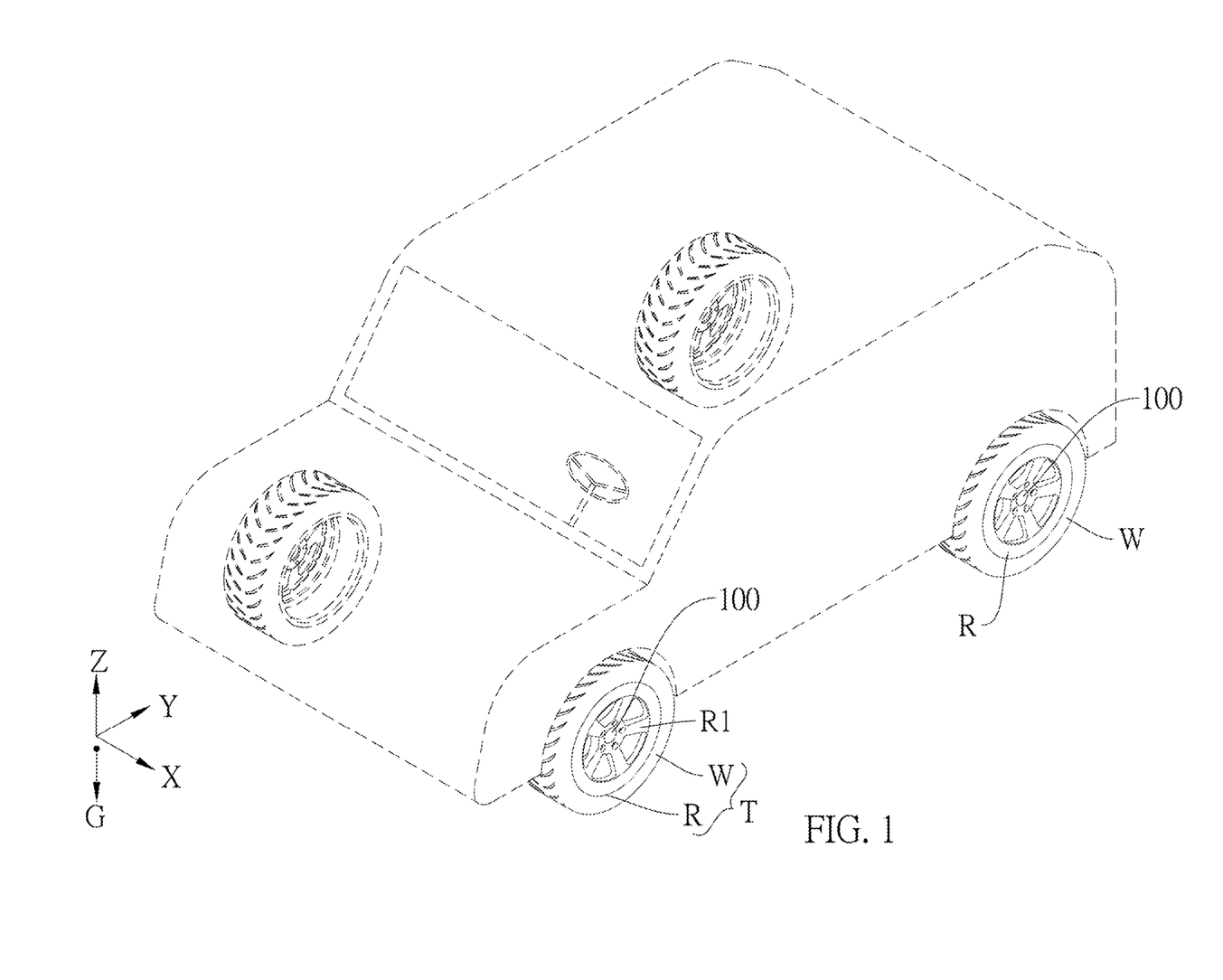
FIG. 1 is a schematic diagram showing a rim accessory for wheel positioning angle detection which is installed in a rim according to an embodiment of the present disclosure.
Figure 2:
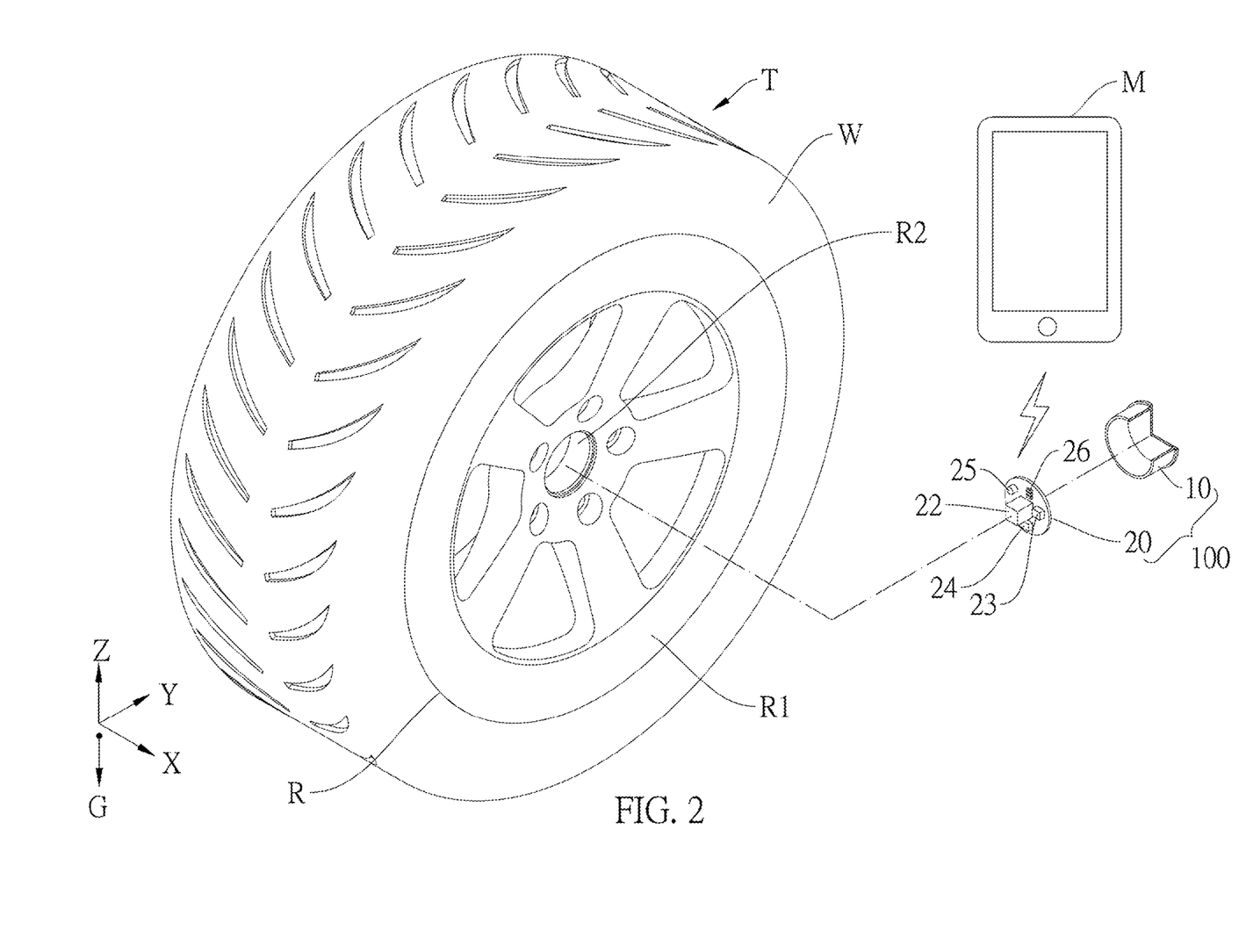
FIG. 2 is an explosive diagram of a rim accessory for wheel positioning angle detection which is installed in a rim according to an embodiment of the present disclosure.
Figure 3:
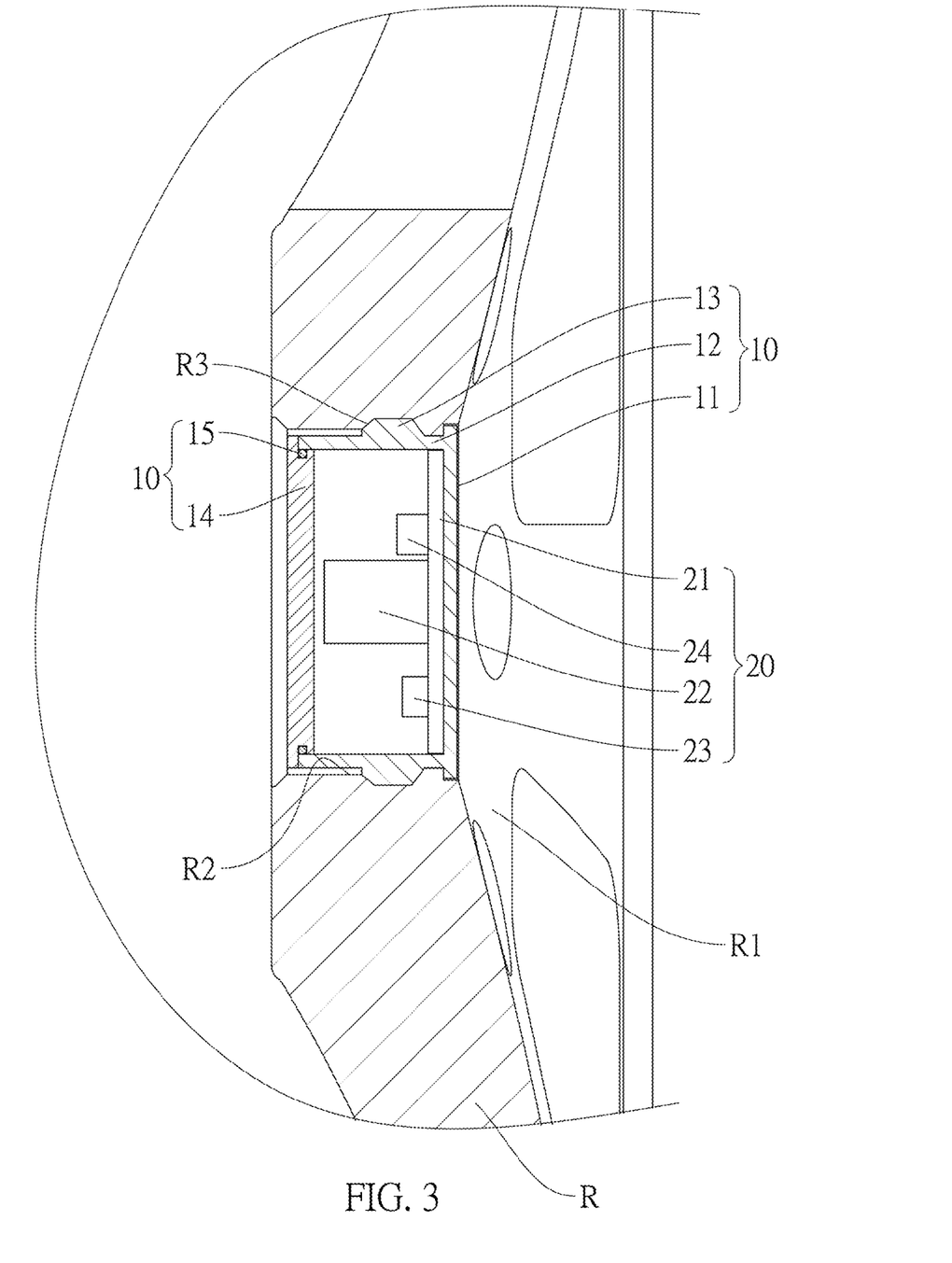
FIG. 3. is a sectional view of a rim accessory for wheel positioning angle detection which is installed in a rim according to an embodiment of the present disclosure.

The housing body 10 of the present disclosure comprises a bottom wall 11 and a peripheral wall 12. The peripheral wall 12 is connected to the bottom wall 11 to form an accommodation space S. The sensor module 20 is installed on the bottom wall 11 and located in the accommodation space S. The peripheral wall 12 has a clamping structure 13 for clamping to the central hole R2. A top end of the peripheral wall 12 has a cover 14 which can be used to seal the accommodation space S. A sealing part 15 can be disposed at the connection of the cover 14 and the peripheral wall 12, so as to prevent moisture or dust from entering the accommodation space S to corrode or damage the sensor module 20. The clamping structure 13 in the embodiment is a clamping bump, which is used to clamp to a clamping hole R3 of the central hole R2, and the sealing part 15 is an O-ring. In another embodiment, the sensor module 20 itself may also include a sealed casing, and the electronic components are sealed in the sealed casing to prevent external moisture or dust from entering the sensor module 20 during driving, which corrodes or damages the sensor module 20.

Figure 4:
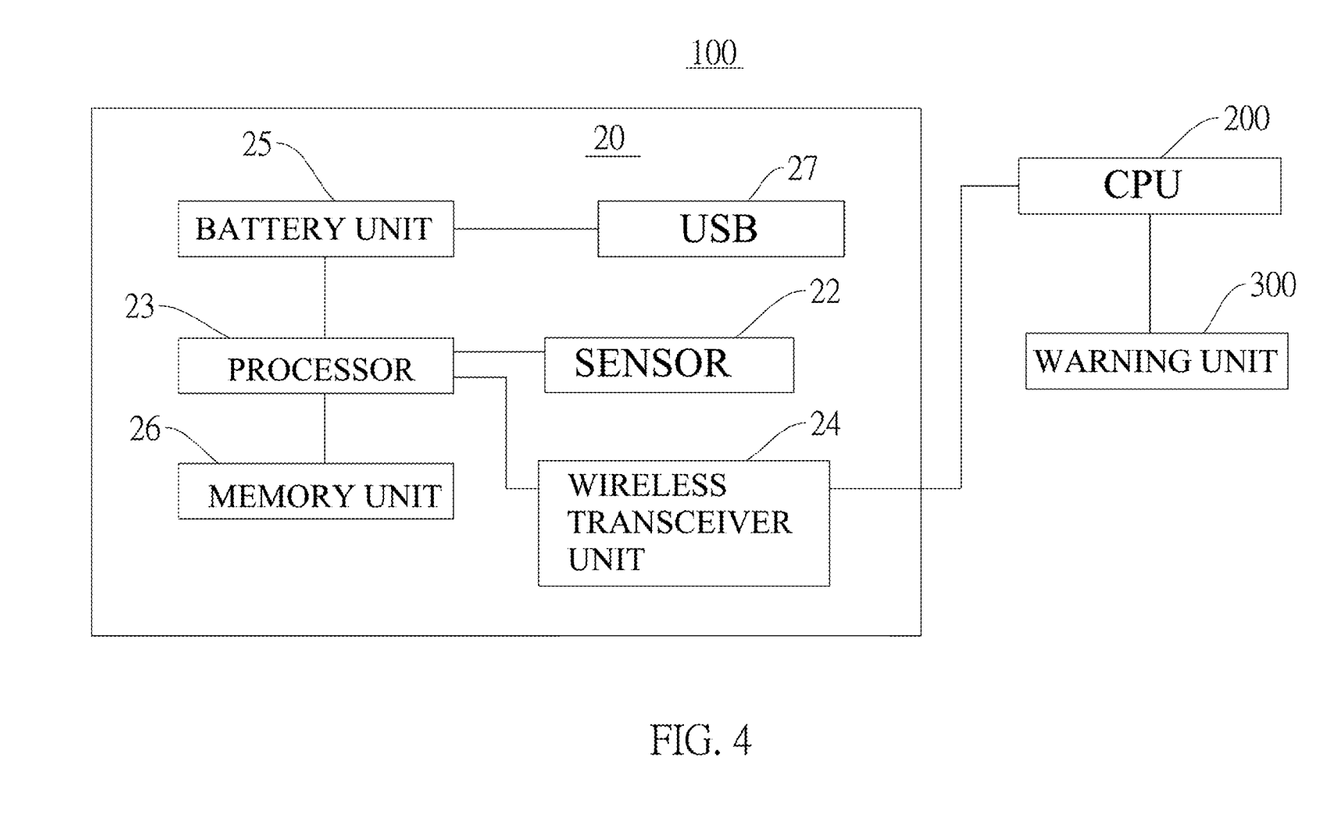
FIG. 4 is a block diagram of a rim accessory for wheel positioning angle detection according to an embodiment of the present disclosure.

The sensor module 20 comprises a circuit board 21, multiple sensors 22, a processor 23, a wireless transceiver unit 24, a battery unit 25 and a memory unit 26. The sensor 22, the processor 23, the wireless transceiver unit 24, the battery unit 25 and the memory unit 26 are arranged on the circuit board 21, and the plurality of sensors 22 include an accelerometer and a gyroscope of the micro-electromechanical system (MEMS), and the accelerometer can also be called an acceleration sensor which is implemented by a gravity accelerometer, wherein the gravity accelerometer detects components of a gravity acceleration in three measurement axes, and the measured components are output as the measurement data, that is, the gravity accelerometer is a three-axes accelerometer. The measurement data is transmitted to the processor 23, and the processor 23 comprises a calculation unit. The computing unit calculates the measurement data according to a specific algorithm (i.e., the specific algorithm can be any existing algorithm for obtaining the inclined angle data) to obtain the inclined angle data, and the obtained inclined angle data is transmitted to the vehicle computer of the vehicle or the mobile device of the driver through the wireless transceiver unit 24. The battery unit 25 provides electricity to the sensor module 20, and the memory unit 26 can stores a firmware which is executed by the processor 23 for calculation and transmission. The battery unit 25 may be a button battery or a rechargeable lithium battery. In another embodiment, after the measurement data is sent to the processor 23, the processor 23 does not perform the calculation but sends the measurement data to the vehicle computer of the vehicle or the mobile device of the driver through the wireless transceiver unit 24, and the vehicle computer or the mobile device can perform the calculation according to the data. The vehicle computer or mobile device calculates the inclined angle data according to the specific algorithm. The sensor module 20 further comprises a universal serial bus (USB) port 27, so as to the user can update the firmware of the sensor module 20 and charge the battery unit 25 (when the battery unit 25 is a rechargeable secondary battery, such as a lithium battery) via the USB port 27.

A warning system for the wheel positioning angle detection can be applied in the vehicle, and the warning system comprises four rim accessories 100 for the wheel positioning angle detection, four wheels 100, a central processing unit 200 and a warning unit 300. The wheel T is installed with the rim accessory 100 for the wheel positioning angle detection. The rim accessory 100 for the wheel positioning angle detection is used to detect the inclined angle of the wheel T. The central processing unit 200 receives the multiple measurement data and calculate the multiple inclined angle data, or the processor 23 of the sensor module 20 calculates the multiple inclined angle data and transmits the multiple inclined angle data to the central processing unit 200. The central processing unit 200 compares the multiple inclined angle data and the standard values, and when the inclined angle data deviates from a specific range of the standard value, the central processing unit 200 generates a control signal to the warning unit 300, and the warning unit 300 connected to the central processing unit 200 sends out a warning message when receiving the control signal.

As shown FIG. 2, the central processing unit 200 can be a central processor of the mobile device M, the warning unit 300 can be a display of the mobile device M. After the mobile device M is installed with an application program corresponding to the rim accessory 100 for the wheel positioning angle detection, the inclined angle data of each wheel T can be displayed on the display of the mobile device M in real time, and the warning message is presented on the display. In another one embodiment, the central processing unit 200 is a central processor of the vehicle computer of the vehicle, and the warning unit 300 is a display of a center control platform of the vehicle or a light sign device on a dashboard of the vehicle.

Figure 6A:
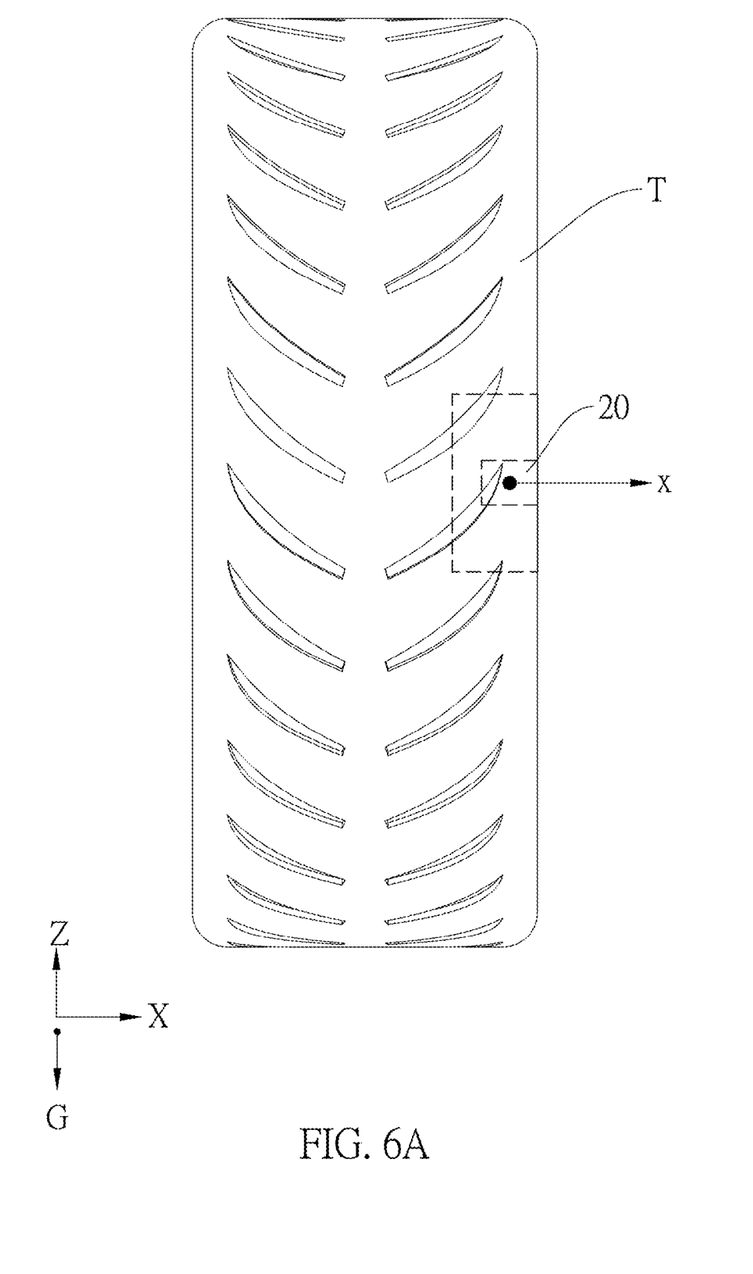
FIG. 6A is a schematic diagram showing that an inclined angle of a wheel is not generated in a first reference axis (X axis).
Figure 6B:
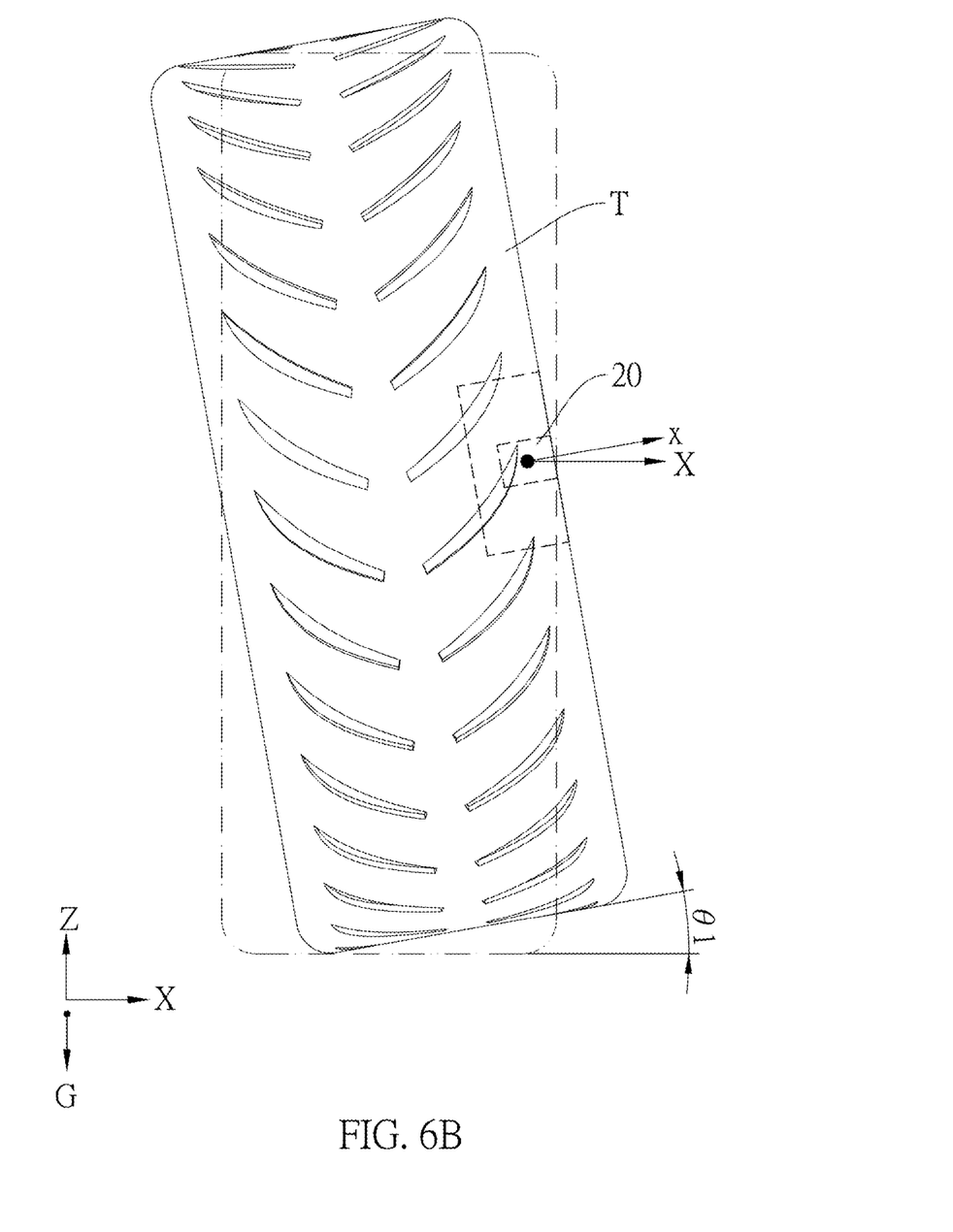
FIG. 6B is a schematic diagram showing that an inclined angle (outer inclined angle) of a wheel is generated in a first reference axis (X axis).
Figure 7A:
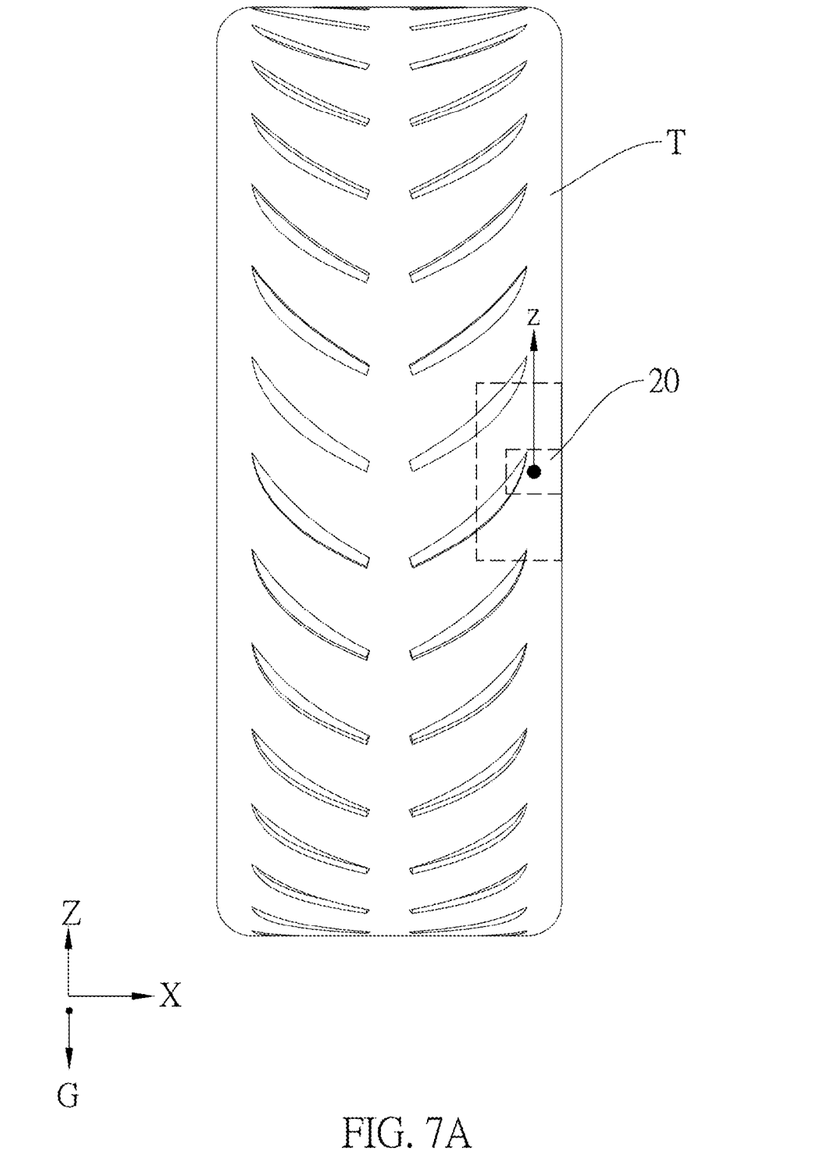
FIG. 7A is a schematic diagram showing that an inclined angle of a wheel is not generated in a third reference axis (Z axis).
Figure 7B:
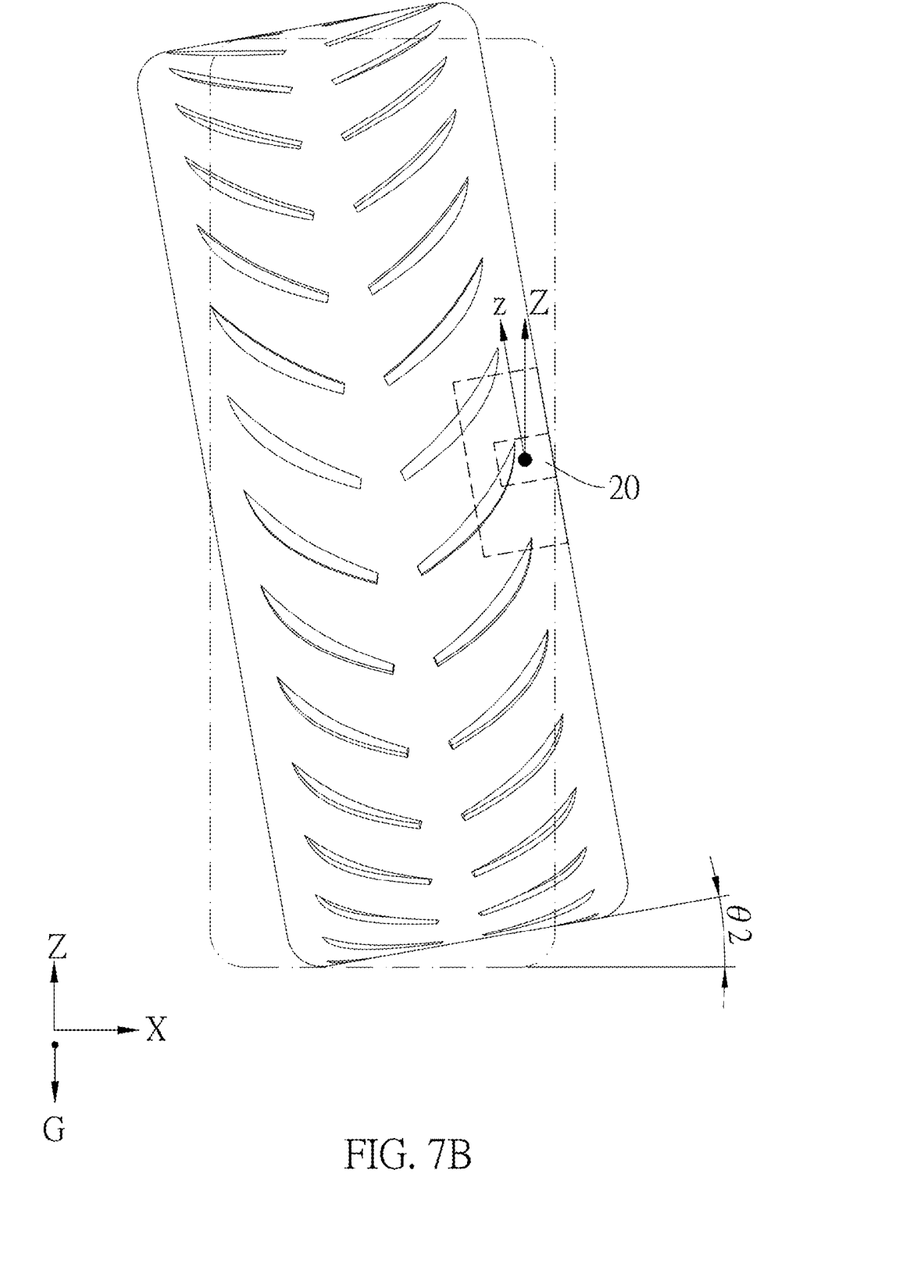
FIG. 7B is a schematic diagram showing that an inclined angle (outer inclined angle) of a wheel is generated in a third reference axis (Z axis).
Figure 8:
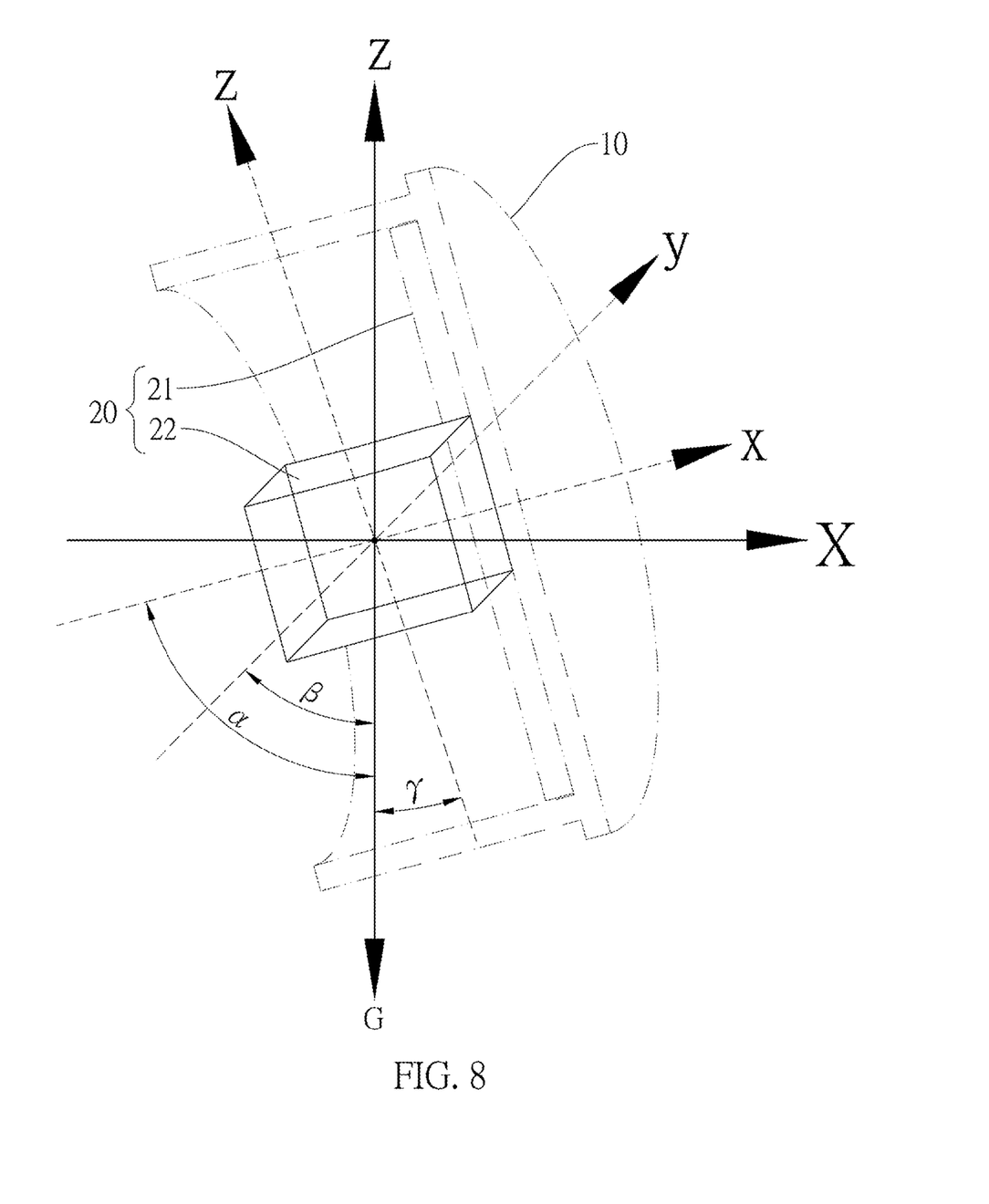
FIG. 8 is schematic diagram showing a first measurement axis, a second measurement axis and a third measurement axis of a sensor module in a rim accessory for wheel positioning angle detection, a horizontal line and a gravity direction.

As shown in FIG. 5, FIG. 6A, FIG. 6B, FIG. 7A, FIG. 7B and FIG. 8, after the accelerometer or gyroscope of the sensor 22 of the sensor module 20 is installed in the wheel T, the accelerometer or gyroscope measures accelerations and an angular velocities of the corresponding wheel in three measurement axes, as shown in FIG. 8, wherein the three measurement axes of the accelerometer are respectively a first measurement axis x, a second measurement axis y and a third measurement axis z. The first measurement axis x is vertical to a axial surface R1 of the rim R, and preferably, the first measurement axis x is located at the center of the rim cover and/or a central axis of the central hole R2 of the rim R. The second measurement axis y and the third measurement axis z are parallel to the axial surface R1 of the rim R and vertical to the first measurement axis x, and the second measurement axis y and third measurement axis z are vertical to each other. When the wheel T having the rim accessory 100 for the wheel positioning angle detection is installed in the vehicle, the first measurement axis x, the second measurement axis y and the third measurement axis z are respectively corresponding to a first reference axis X, a second reference axis Y and a third reference axis Z. Preferably, when the wheel T having the rim accessory 100 for the wheel positioning angle detection is installed in the vehicle, the first measurement axis x, the second measurement axis y and the third measurement axis z are respectively parallel to a first reference axis X, a second reference axis Y and a third reference axis Z.

The inclined angle data of the wheel T is measured based three reference axes, the three reference axes are respectively a first reference axis X, a second reference axis Y and a third reference axis Z, and that is, the inclined angle data of the wheel T are multiple inclined angle data in the multiple reference axes, wherein the first reference axis X is parallel to the wheel shaft F and vertical to the gravity direction G. The first reference axis X in the embodiment can be an extending direction of the wheel shaft F. The second reference axis Y is vertical to the first reference axis X and vertical to the gravity direction G. The second reference axis Y in the embodiment is a moving direction of the vehicle or a longitudinal direction of the vehicle. The third reference axis Z is parallel to the gravity direction G, i.e., a vertical direction. Thus, the inclined angle of the wheel T (i.e., the included angle) in respect to the first reference axis X or the third reference axis Z are outer inclined angle, as shown in the embodiment of FIG. 5, FIG. 6A, FIG. 6B, FIG. 7A, FIG. 7B and FIG. 8.

Figure 5:
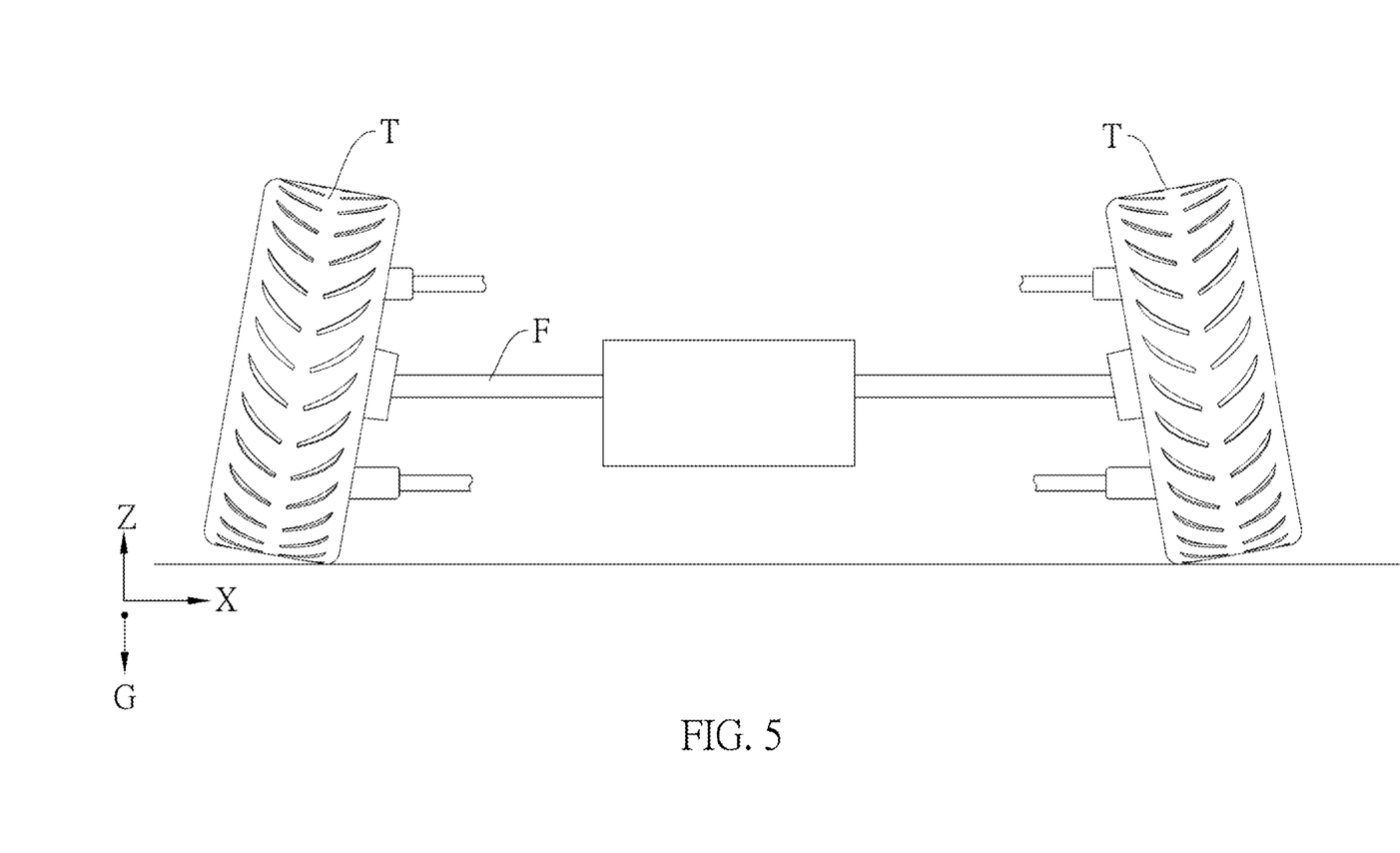
FIG. 5 is a schematic diagram showing generation of an outer inclined angle of a wheel.

For example, FIG. 5 is a schematic diagram showing generation of an outer inclined angle of a wheel, FIG. 6A is a schematic diagram showing that an inclined angle of a wheel is not generated in a first reference axis (X axis), and FIG. 6B is a schematic diagram showing that an inclined angle (outer inclined angle) of a wheel is generated in a first reference axis (X axis). When the wheel T and the first reference axis X form an inclined angle $\theta_1$, i.e., the outer inclined angle (camber), the first measurement axis x and the first reference axis X of the accelerometer of sensor 22 also form an included angle being same to the inclined angle $\theta_1$. In such situation, the accelerometer can measure the component $g_x$, of the gravitational acceleration g in the first measurement axis x. Next, according to an equation, $g_x=g \sin(\theta_1)$, i.e., the component $g_x$ of the gravitational acceleration g in the first measurement axis x measured by accelerometer is the product of the acceleration of gravity g and the sine of the inclined angle $\theta_1$, an value of the inclined angle $\theta_1$ can be obtained, i.e., the value of the outer inclined angle can be obtained.

Similarly, FIG. 7A is a schematic diagram showing that an inclined angle of a wheel is not generated in a third reference axis (Z axis), and FIG. 7B is a schematic diagram showing that an inclined angle (outer inclined angle) of a wheel is generated in a third reference axis (Z axis). When the wheel T form an inclined angle $\theta_2$ in respect to the third reference axis Z, i.e., the outer inclined angle (camber), the third measurement axis z and the third reference axis Z of the accelerometer of sensor 22 also form an included angle being same to the inclined angle $\theta_2$. In such situation, the accelerometer can measure the component $g_z$ of the gravitational acceleration g in the third measurement axis z. Next, according to an equation, $g_z=g \cos(\theta_2)$, i.e., the component $g_z$ of the gravitational acceleration g in the third measurement axis z measured by accelerometer is the product of the acceleration of gravity g and the cosine of the inclined angle $\theta_2$, an value of the inclined angle $\theta_2$ can be obtained, i.e., the value of the outer inclined angle can be obtained.

Accordingly, the sensor module 20 comprises a circuit board 21, at least a sensor 22, a processor 23, a wireless transceiver unit 24, a battery unit 25 and a memory unit 26. One of the sensors 22 is used to measure the component $g_x$, of the gravitational acceleration g in the first measurement axis x, and/or another one of the sensors 22 is used to measure the component $g_z$ of the gravitational acceleration g in the third measurement axis z. When the wheel T having the rim accessory 100 for the wheel positioning angle detection is installed in the vehicle, the first measurement axis x and the third measurement axis z are respectively corresponding to the first reference axis X and the third reference axis Z. Preferably, when the wheel T having the rim accessory 100 for the wheel positioning angle detection is installed in the vehicle, the first measurement axis x and the third measurement axis z are respectively parallel to the first reference axis X and the third reference axis Z. It is noted that, when the wheel T having the rim accessory 100 for the wheel positioning angle detection is installed in the vehicle, the first measurement axis x of the sensor 22 is vertical to the axial surface R1 of the first measurement axis x, and the first measurement axis x is located at the center of the rim cover and/or a central axis of the central hole R2 of the rim R. Preferably, the first measurement axis x and the central axis of the central hole R2 of the rim R are overlapped with each other, such that, even when the vehicle continues to move in a non-stopped states, and outer inclined angle can be still measured. Certainly, when the wheel T having the rim accessory 100 for the wheel positioning angle detection is installed in the vehicle, the third measurement axis z is vertical to the central axis of the central hole R2 of the rim R, and the third measurement axis z is parallel to the third reference axis Z.

As shown in FIG. 8, the three-axes accelerometer can used to detect other angles of the wheel. In FIG. 8, a horizontal direction is along the first reference axis X, and the components of the gravitational acceleration g measured by the accelerometer in the first measurement axis x, the second measurement axis y and the third measurement axis z are respectively $g_x$, $g_y$, and $g_z$. The component $g_x$ and the gravity direction G has an included angle $\alpha$, the component $g_y$ and the gravity direction G has an included angle $\beta$, and the component $g_z$ and the gravity direction G has an included angle $\gamma$. Since $g_x=g \cos(\alpha)$, i.e., the component $g_x$ of the gravitational acceleration g in the first measurement axis x measured by accelerometer is the product of the acceleration of gravity g and the sine of the included angle $\alpha$, the included angle $\alpha$ can be obtained. Since $g_y=g \cos(\beta)$, the component $g_y$ of the gravitational acceleration g in the second measurement axis y measured by accelerometer is the product of the acceleration of gravity g and the sine of the included angle $\beta$, the included angle $\beta$ can be obtained. Since $g_z=g \cos(r)$, the component $g_z$ of the gravitational acceleration g in the second measurement axis z measured by accelerometer is the product of the acceleration of gravity g and the sine of the included angle γ, the included angle γ can be obtained.

Therefore, a plurality of inclined angle data and other angle data of the wheel T can be obtained by the accelerometer. In addition, the gyroscope can measure the angular velocity of the wheel T in respect to the first measurement axis x, the second measurement axis y and the third measurement axis z, which can be used to assist in judging and correcting each inclined angle data in each inclined angle data calculation.

Figure 9:
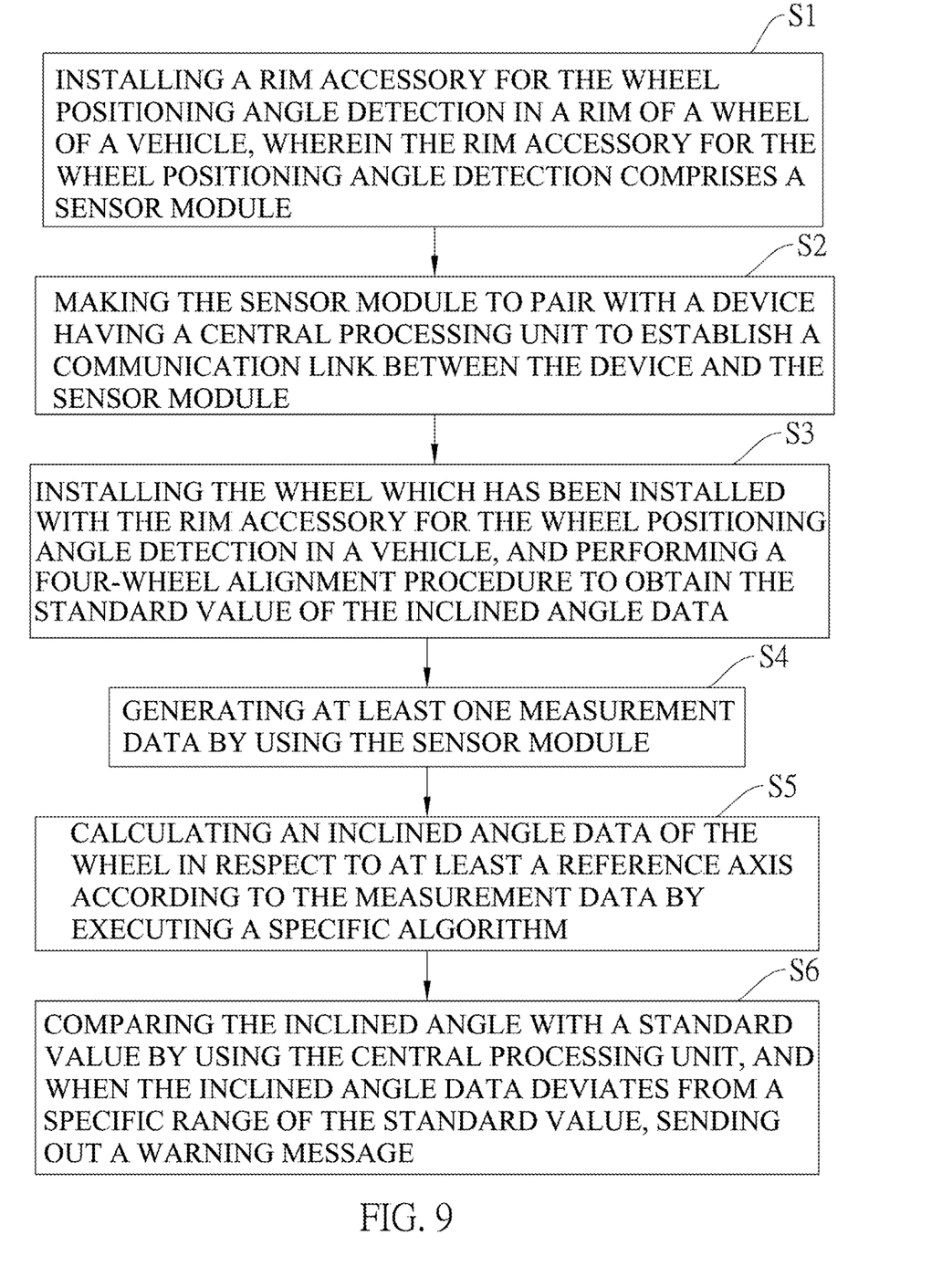
FIG. 9 is a flow chart of a warning method for wheel positioning angle detection according to an embodiment of the present disclosure.

Refer to FIG. 9, which shows an embodiment of a warning method for wheel positioning angle detection. As shown FIG. 9, a step S1 is an installation step. In the step S1, a rim accessory for the wheel positioning angle detection is installed in a rim of a wheel of a vehicle, and then, the tire is installed on the rim to form a wheel, wherein the rim accessory for the wheel positioning angle detection comprises a sensor module. Next, a step S2 is executed.

The step S2 is a communication paring step. In the step S2, the sensor module pairs with a device having a central processing unit to establish a communication link between the device and the sensor module. For example, the sensor module comprises a wireless transceiver unit. The wireless transceiver unit can comprise a Bluetooth chip, such that the sensor module and a mobile device of a driver or a vehicle computer of a vehicle can form a communication link therebetween. Next, a step S3 is executed.

The step S3 is a calibration step. In the step S3, the wheel which has been installed with the rim accessory for the wheel positioning angle detection is installed in a vehicle, and a four-wheel alignment procedure is performed to obtain standard values of multiple inclined angle data. For example, the wheel having the rim accessory for the wheel positioning angle detection is installed in the vehicle at the manufacturer that implements the four-wheel alignment of the vehicle, and then the four-wheel alignment of the vehicle is performed via a standard process. After the four-wheel alignment of the vehicle is finished, the inclined angle data of the wheel measured by the sensor module is the standard value, and the standard value can be stored in the mobile device of the driver or the vehicle computer of the vehicle as a basis for comparison. Next, a step S4 is executed.

The step S4 is a measuring step. In the step S4, at least one measurement data is generated by using the sensor module. When the vehicle is in a stopped state (the vehicle stops when it encounters a red light on a traffic sign) or continues to move, the sensor module continuously generates the multiple measurement data, and the multiple measurement data are the acceleration values in the three measurement axes. Next, a step S5 is executed.

The step S5 is a calculating step. In the step S5, the multiple inclined angle data of the wheels in respect to at least a reference axis are calculated according to the multiple measurement data by executing a specific algorithm, wherein the calculation can be performed by a processor of the sensor module or a central processing unit. Next, a step S6 is executed.

The step S6 is a comparing and warning step. In the step S6, the central processing unit compares the inclined angle with a standard value, and when the inclined angle data deviates from a specific range of the standard value, the central processing unit sends out a warning message.

To sum up, a rim accessory for wheel positioning angle detection of the present disclosure can be detachably installed in a rim, and the user can buy it and then install it in the rim. When the vehicle is in a stopped state (the vehicle stops when it encounters a red light on a traffic sign) or when it continues to move, it detects the value of each inclined angle of the wheel, such as the outer inclined angle (camber, the included angle formed by a center line of the wheel and the vertical line) and other angles, and after comparing with the standard value range of each inclined angle, a warning message will be issued if the inclined angle deviates from the standard value range.

While the present disclosure has been described by way of example and in terms of preferred embodiment, it is to be understood that the present disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A rim accessory for wheel positioning angle detection, detachably installed in a rim, wherein the rim has a peripheral surface and an axial surface, the peripheral surface of the rim is used to combine with a tire to form a wheel, the axial surface is rotatably combined with a wheel shaft, and the rim accessory for the wheel positioning angle detection comprises:
   a housing body, detachably installed in the rim; and
   a sensor module, installed in the housing body, configured to generate at least one measurement data, wherein the at least one measurement data is used to calculate an inclined angle data of the wheel in respect to at least a reference axis;
   wherein the housing body is a rim cover of the rim which is installed in a central hole, the sensor module comprises at least a sensor, and the sensor is an accelerometer of a micro electromechanical system (MEMS).

2. The rim accessory for the wheel positioning angle detection of claim 1, wherein the sensor module is installed on a surface of the housing body facing to the central hole.

3. The rim accessory for the wheel positioning angle detection of claim 2, wherein the sensor module is located in the central hole.

4. The rim accessory for the wheel positioning angle detection of claim 1, wherein the housing body has a bottom wall and a peripheral wall connected to the bottom wall, the bottom wall and the peripheral wall forms an accommodation space, the sensor module is disposed on the bottom wall and located in the accommodation space, and the peripheral wall has a clamping structure, such that the housing body is able to be clamped to the central hole.

5. The rim accessory for the wheel positioning angle detection of claim 1, wherein the sensor module further comprises a circuit board, and the accelerometer is disposed on the circuit board.

6. The rim accessory for the wheel positioning angle detection of claim 5, wherein the at least one measurement data is multiple measurement data, the multiple measurement data are gravitational acceleration components measured by the accelerometer respectively along a first measurement axis, a second measurement axis and a third measurement axis, the first measurement axis is vertical to the axial surface of the rim, the second measurement axis and the third measurement axis are parallel to the axial surface of the rim and vertical to the first measurement axis, the second measurement axis and the third measurement axis are vertical to each other.

7. The rim accessory for the wheel positioning angle detection of claim 6, wherein the sensor module further comprises a processor and a wireless transceiver unit, the processor and the wireless transceiver unit are disposed on the circuit board, the sensor and the wireless transceiver unit are electrically connected to the processor, the multiple measurement data are transmitted to the processor, and the processor performs a calculation on the multiple measurement data, or indicates the wireless transceiver unit to send the multiple measurement data.

8. The rim accessory for the wheel positioning angle detection of claim 7, wherein the processor comprises a calculation unit, the calculation unit receives the multiple measurement data and calculates the multiple inclined angle data by using a specific algorithm.

9. The rim accessory for the wheel positioning angle detection of claim 8, wherein the sensor module further comprises a battery unit, the battery unit is connected to the processor, and the battery unit provides electricity to the sensor module.

10. The rim accessory for the wheel positioning angle detection of claim 1, wherein a first measurement axis of the sensor is vertical to the axial surface of the rim.

11. The rim accessory for the wheel positioning angle detection of claim 10, wherein the first measurement axis is disposed on a center of the rim cover and/or a central axis of the central hole of the rim.

12. The rim accessory for the wheel positioning angle detection of claim 11, wherein the first measurement axis is overlapped with the central axis of the central hole of the rim.

13. A warning system for wheel positioning angle detection, comprising:

the rim accessory for the wheel positioning angle detection of claim 1;

a central processing unit, used to receiving the measurement data to calculate the inclined angle, or used to receive the inclined angle, and used to compare the inclined angle data with a standard value, wherein when the inclined angle data deviates from a specific range of the standard value, the central processing unit generates a control signal; and a warning unit, connected to the central processing unit, used to receive the control signal and send out a warning message.

14. The warning system for the wheel positioning angle detection of claim 13, further comprising:

the wheel, having the rim accessory for the wheel positioning angle detection.

15. The warning system for the wheel positioning angle detection of claim 13, wherein the warning unit is a sign device on a dashboard of the vehicle.

16. The warning system for the wheel positioning angle detection of claim 13, wherein the central processing unit is installed in a vehicle computer of a vehicle, or the central processing unit is installed in a mobile device.

17. The warning system for the wheel positioning angle detection of claim 16, further comprising:

a display, used to display the inclined angle data on the display, and the display acts as the warning unit to display the warning message.

* * * * *